US006414406B1

(12) United States Patent
Ikoma et al.

(10) Patent No.: US 6,414,406 B1
(45) Date of Patent: Jul. 2, 2002

(54) SOLENOID ACTUATOR

(75) Inventors: Kouichi Ikoma; Yoshinori Onohara; Osamu Suzuki, all of Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 63 days.

(21) Appl. No.: 09/695,222

(22) Filed: Oct. 25, 2000

(30) Foreign Application Priority Data

Oct. 28, 1999 (JP) .......................................... 11-307615

(51) Int. Cl.[7] ............................ H02K 33/12; F01L 9/04

(52) U.S. Cl. ............................. 310/30; 310/17; 310/14; 335/262

(58) Field of Search ............................. 310/14, 23, 30, 310/34, 12, 17; 335/249, 262, 263, 279, 281

(56) References Cited

U.S. PATENT DOCUMENTS 2,121,657 A * 6/1938 Fisher ........................ 335/245
4,533,890 A * 8/1985 Patel .......................... 335/234
4,835,425 A * 5/1989 LaSota ........................ 310/14

* cited by examiner

*Primary Examiner*—Nestor Ramirez
*Assistant Examiner*—Judson H. Jones
(74) *Attorney, Agent, or Firm*—Arent Fox Kintner Plotkin & Kahn, PLLC

(57) ABSTRACT

There is provided a provide a solenoid actuator which is capable of smoothly driving a driven member, with enhanced durability, and at the same time permits the stroke of the driven member to be changed with ease. A solenoid actuator drives a valve by an electromagnetic force such that the valve performs reciprocating motion. An armature is connected to the valve, for performing reciprocating motion in accordance with energization and deenergization of at least one electromagnet to thereby drive the valve such that the valve performs the reciprocating motion. The armature has two end faces extending in parallel with each other in a direction orthogonal to a direction of the reciprocating motion thereof. Two guide joints have respective two guide surface opposed to the two end faces of the armature, each formed with two armature guides. The two guide joints slidably guide the reciprocating motion of the armature in a state of the two end faces of the armature being in line contact with the four armature guides of the two guide surfaces thereof.

5 Claims, 8 Drawing Sheets

SOLENOID ACTUATOR

BACKGROUND OF THE INVENTION

1. Field of the Invention

This invention relates to a solenoid actuator for reciprocatingly driving a driven member by an electromagnetic force.

2. Description of the Prior Art

Conventionally, a solenoid actuator of this kind has been proposed e.g. in Japanese Laid-Open Patent Publication (Kokai) No. 10-294214, which is applied to a valve-actuating mechanism for driving a valve of an internal combustion engine to open and close the valve. This valve-actuating mechanism includes an armature in the form of a rectangular plate, and upper and lower electromagnets, rectangular in cross-section, for vertically attracting the armature, and upper and lower rods extending upward and downward from the armature, respectively. The upper and lower rods are circular in cross-section, and the lower rod is linked to the valve.

When the solenoid actuator described above is in operation, the upper and lower electromagnets are alternately energized and deenergized to alternately attract the armature whereby the armature performs vertical reciprocation motion. In accordance with the vertical reciprocating motion of the armature, the upper and lower rods slide upward and downward to open and close the valve.

In the solenoid actuator having the armature and electromagnets, rectangular in cross-section, when the armature performs vertical reciprocating motion during operation of the solenoid actuator, it is necessary to prevent the armature from rotating about an axis extending along the direction of the vertical reciprocating motion thereof. This is because if such a rotation occurs, the armature rectangular in cross-section abuts components therearound, such as a casing housing the armature, to cause interference therewith. This can prevent smooth driving of the driven member, such as the valve, or cause breakage of the armature and/or the casing.

SUMMARY OF THE INVENTION

It is an object of the invention to provide a solenoid actuator which is capable of smoothly driving a driven member, with enhanced durability, and at the same time permits the stroke of the driven member to be changed with ease.

To attain the above object, the present invention provides a solenoid actuator for driving a driven member by an electromagnetic force such that the driven member performs reciprocating motion, comprising:

at least one electromagnet;

an armature connected to the driven member, for performing reciprocating motion in accordance with energization and deenergization of the at least one electromagnet to thereby drive the driven member such that the driven member performs the reciprocating motion, the armature having two end faces extending in parallel with each other in a direction orthogonal to a direction of the reciprocating motion thereof; and guide means having two guide surfaces opposed to the two end faces of the armature, respectively, the two guide surfaces being formed with a total of at least three protrusions at respective locations each of the two guide surfaces being formed with at least one of the at least three protrusions, the guide means slidably guiding the reciprocating motion of the armature in a state of the two end faces of the armature being in partial contact with the at least three protrusions of the two guide surfaces of the guide means.

According to this solenoid actuator, in accordance with energization and deenergization of the at least one electromagnet, the armature is reciprocatingly moved while being guided by the guide means to drive the driven member such that the driven member performs reciprocating motion. During the reciprocating motion of the armature, the armature is guided by the guide means in a state of the two parallel end faces thereof being in partial contact with the at least three protrusions of the two guide surfaces of the guide means. Therefore, even if a rotational force for rotating the armature about an axis along the direction of the reciprocating motion thereof is applied to the armature, the guide means inhibits the armature from rotating about the axis. Further, since the armature slides in a state in partial contact with each of the at least three protrusions on the guide surface, the armature receives a small sliding resistance from the guide means. These features ensure the smooth opening and closing operations of the driven member, and at the same time enhance the durability of the solenoid actuator.

Preferably, the at least one electromagnet comprises two electromagnets arranged on opposite sides of the armature in the direction of the reciprocating motion thereof, and fixed to each other with the guide means sandwiched therebetween.

According to this preferred embodiment, two electromagnets are fixed to each other with the guide means sandwiched therebetween, and the guide means serves as a spacer defining a distance between the two electromagnets. This makes it possible to change the distance over which the armature reciprocates, i.e. the stroke of the driven member, simply by changing the guide means to another type having a different width in the direction of the reciprocating motion thereof. Therefore, it is possible to change the valve lift amount of the driven member more easily than in the case where the core of each electromagnetic valves is changed.

Preferably, the guide means comprises two guides arranged such that the two guides are opposed to the two end faces of the armature, respectively, and the two guide surfaces are respective surfaces of the two guides facing toward the two end faces of the armature.

More preferably, each of the respective surfaces of the two guides is formed with at least one groove extending along the direction of the reciprocating motion of the armature, a protruding member being fixed to each of the at least one groove, the protruding member having a fitting portion and a guide portion semicircular in cross section and integrally formed with the fitting portion, and each of the at least three protrusions is the guide portion semicircular in cross section and in line contact with a corresponding one of the two end faces of the armature.

Preferably, the solenoid actuator includes a shaft connecting the armature to the driven member and having a flange formed at one end thereof, and the armature is formed with a through hole extending through a central portion thereof along the direction of the reciprocating motor thereof and has a portion surrounding the through hole, the end of the shaft being fitted in the through hole such that the flange abuts the portion surrounding the through hole to thereby support the armature.

The above and other objects, features, and advantages of the invention will become more apparent from the following detailed description taken in conjunction with the accompanying drawings.

DETAILED DESCRIPTION

The invention will now be described in detail with reference to the drawings showing an embodiment thereof. In the embodiment, a solenoid actuator according to the invention is applied to a valve-actuating mechanism of a vehicle engine, not shown, having four valves per cylinder.

Figure 1:
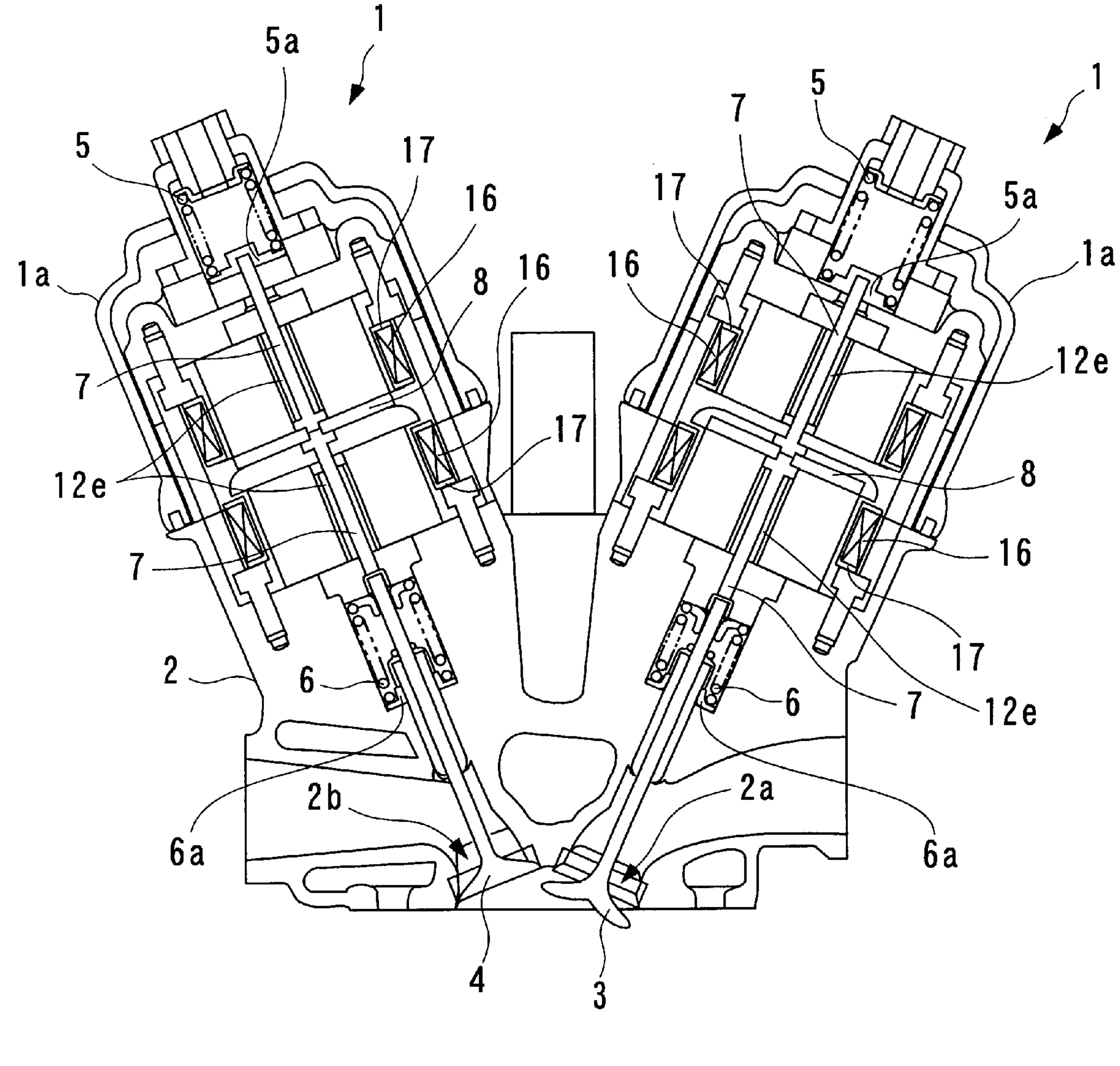
FIG. 1 is a sectional view of a valve-actuating mechanism of a vehicle engine to which is applied a solenoid actuator according to an embodiment of the present invention.

Referring first to FIG. 1, the valve-actuating mechanism is comprised of a pair of solenoid actuators 1, 1 mounted in a cylinder head 2 of the vehicle engine. During operation of the engine, the solenoid actuator 1 arranged on the right-hand side as viewed in the figure drives two intake valves 3, 3 as driven members (only one of them is shown in the figure), thereby opening and closing two intake ports 2*a*, 2*a* (only one of them is shown in the figure) of the engine, while the solenoid actuator 1 arranged on the left-hand side as viewed in the figure drives two exhaust valves 4, 4 as driven members (only one of them is shown in the figure), thereby opening and closing two exhaust ports 2*b*, 2*b* (only one of them is shown in the figure) of the same.

These two solenoid actuators 1, 1 are identical in construction to each other, so that the following description will be made by taking the right-hand solenoid actuator 1 for driving the intake valves 3 as an example. Further, for convenience of description, sides indicated by B and B' of a two-headed arrow B–B' in FIG. 2 are referred to as the "front" side and the "rear" side, respectively, while sides indicated by C and C' of a two-headed arrow C–C' are referred to as the "left" side and the "right" side, respectively.

Figure 2:
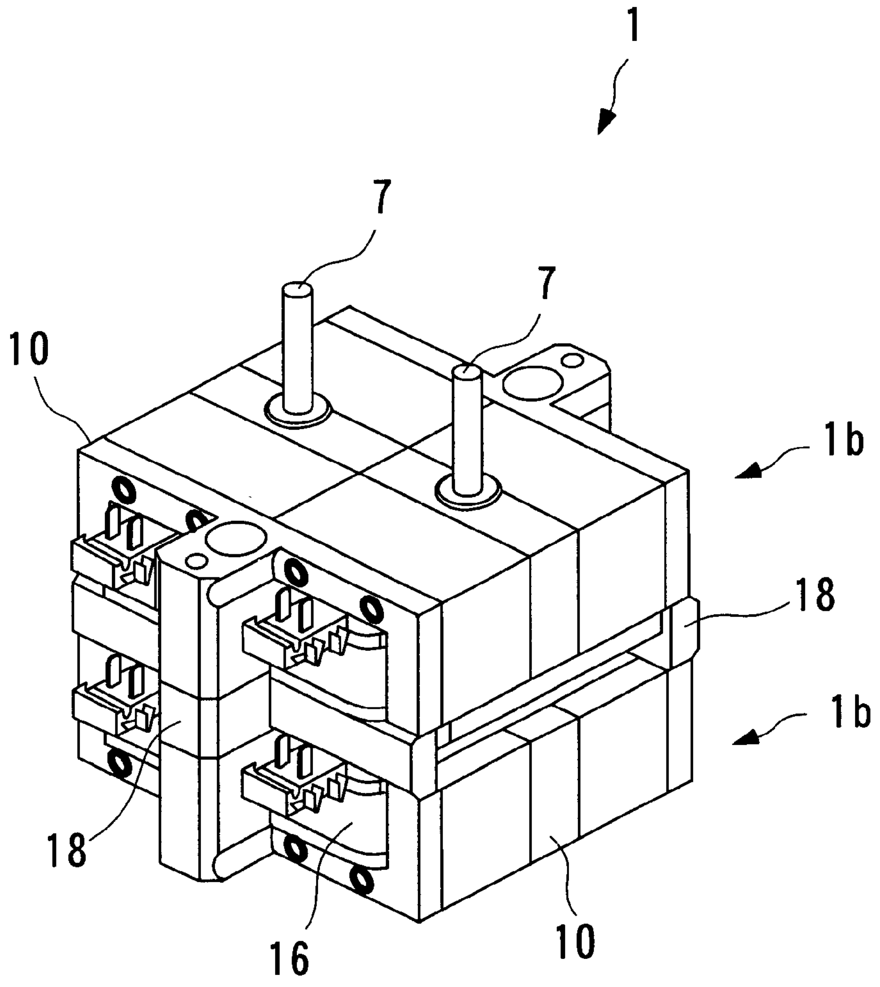
FIG. 2 is a perspective view of the solenoid actuator appearing in FIG. 1.
Figure 2:
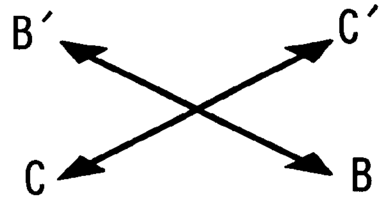
Figure 3:
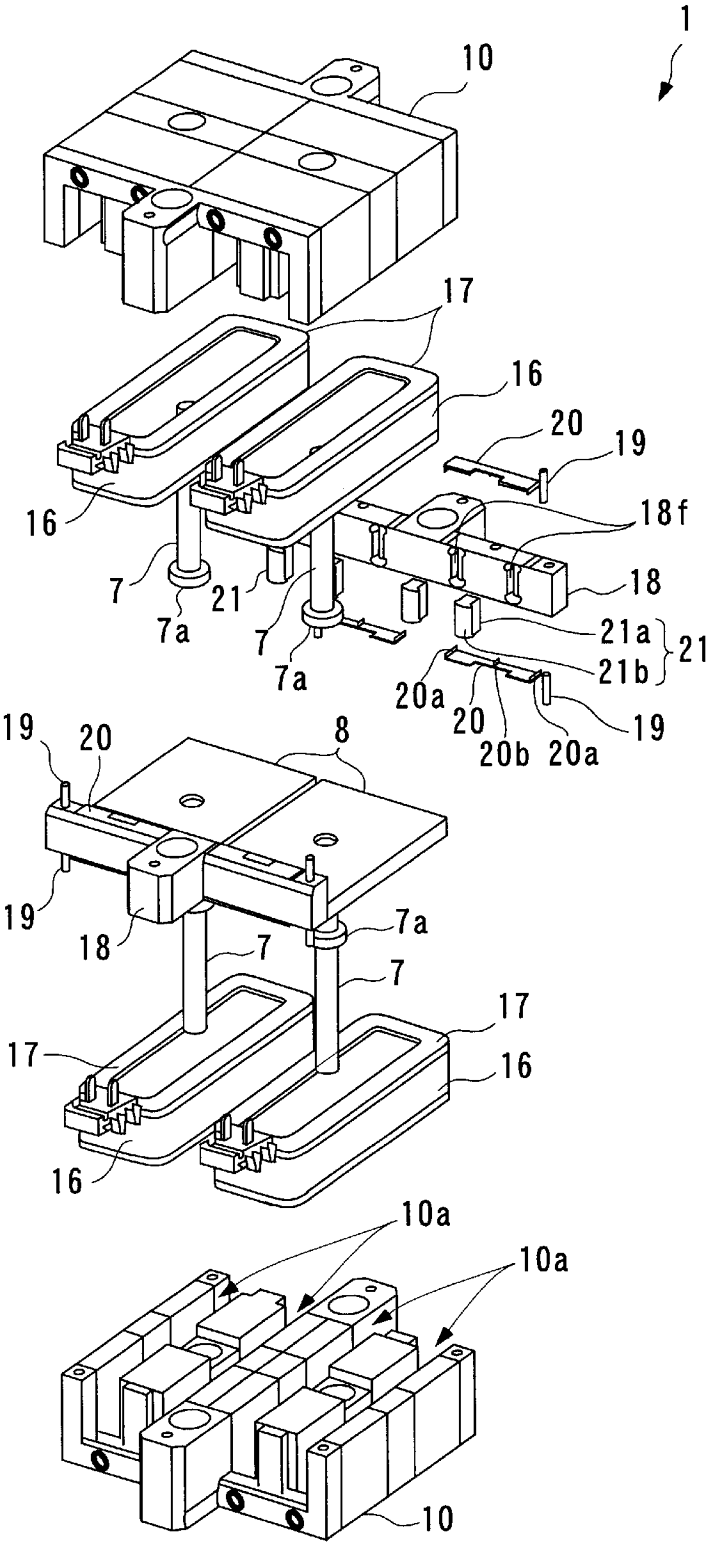
FIG. 3 is an exploded perspective view of FIG. 2 solenoid actuator.

As shown in FIGS. 1 to 3, the solenoid actuator 1 has its front and rear halves constructed symmetrically to each other in the front-rear direction, and the two intake valves 3, 3 are driven by the respective front and rear halves of the solenoid actuator 1. More specifically, the solenoid actuator 1 includes a casing 1*a* (see FIG. 1) mounted in the cylinder head 2, upper and lower electromagnets 1*b*, 1*b* arranged within the casing 1*a* with a predetermined distance therebetween, two armatures 8, 8 arranged within a space between the upper and lower electromagnets 1*b*, 1*b* in a vertically slidable manner, two upper coil springs 5, 5 (only one of them is shown in FIG. 1) for constantly urging the respective armatures 8, 8 downward, and two lower coil springs 6, 6 (only one of them is shown in the figure) for constantly urging the respective armatures 8, 8 upward.

Figure 7A:
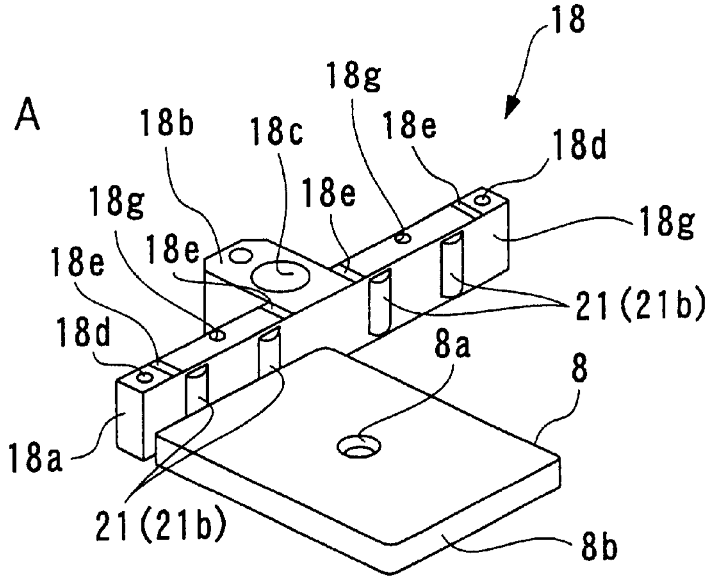
FIG. 7A is a perspective view of a joint and an armature of the FIG. 2 solenoid actuator.
Figure 7B:
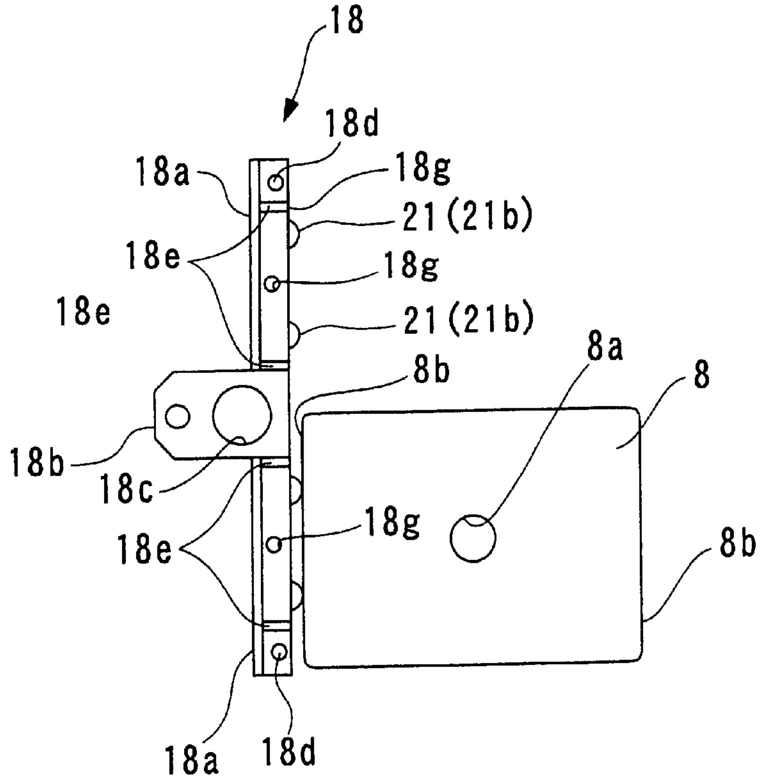
FIG. 7B is a plan view of the joint and the armature of FIG. 7A.

The armatures 8 are rectangular plates each formed of a magnetically soft material (e.g. steel) and having a round through hole 8*a* formed vertically through a center thereof as shown in FIGS. 7A and 7B. Each of the armatures 8 has left and right end faces 8*b*, 8*b* thereof held in contact with armature guides 21 of guide joints 18, referred to hereinafter. The armature 8 moves vertically in a manner guided by the armature guides 21. Further, connected to the armature 8 are upper and lower shafts 7, 7 which are round in cross section and formed of a non-magnetic austenitic stainless steel. The upper end of the lower shaft 7 and the lower end of the upper shaft 7 are fitted in the round through hole 8*a* of the armature 8. The armature 8 is supported in a sandwiched manner by flanges 7*a*, 7*a* formed on the upper and lower shafts 7, 7 at locations close to the lower and upper ends of the respective upper and lower shafts 7, 7 and abutting on a portion of the armature 8 surrounding the through hole 8*a*.

The lower shaft 7 extends vertically through a guide 12*e* of a central core holder 12, referred to hereinafter, of the lower electromagnet 1*b*, and the lower end of the lower shaft 7 is connected to the upper end of the intake valve 3. Similarly, the upper shaft 7 extends vertically through a guide 12*e* of a central core holder 12 of the upper electromagnet 1*b*. The upper shaft 7 is held in contact with the upper coil spring 5 via a spring-seating member 5*a* mounted on the upper end of the upper shaft 7. The shafts 7 are guided through the guides 12*e*, respectively, whenever the armature 8 moves vertically. The intake valve 3 is held in contact with the lower coil spring 6 via a spring-seating member 6*a* mounted on the upper end of the intake valve 3.

As shown in FIGS. 2 and 3, the upper and lower electromagnets 1*b*, 1*b* are connected to each other via the guide joints 18 referred to hereinafter. The electromagnets 1*b*, 1*b* are identical in construction and arranged in a vertically symmetrical manner with the guide joints 18 interposed therebetween. In the following, description is made by taking the lower electromagnet 1*b* as an example.

Figure 4A:
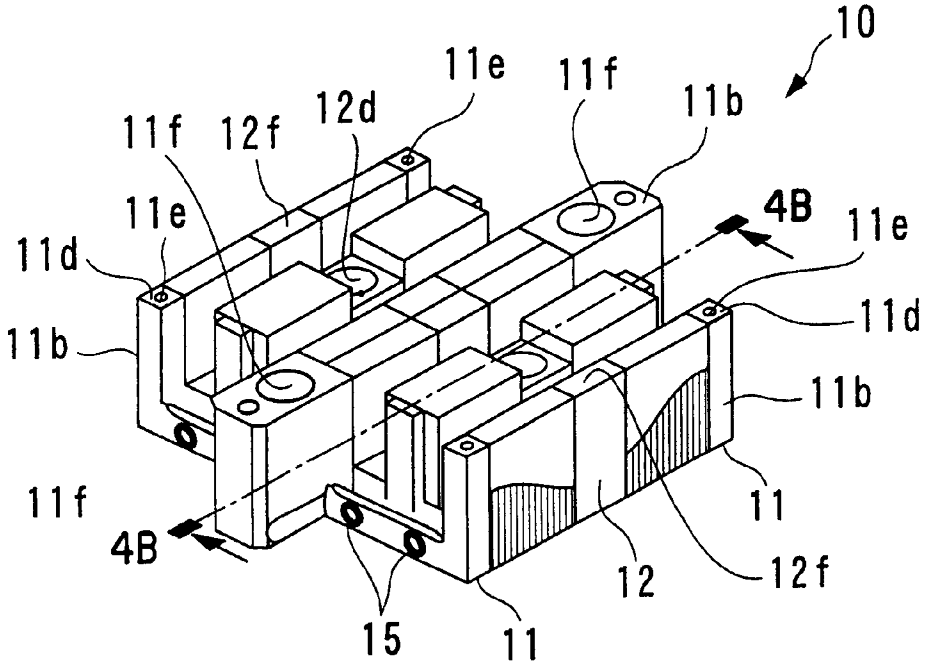
FIG. 4A is a perspective view of a core of the solenoid actuator appearing in FIG. 3.
Figure 4B:
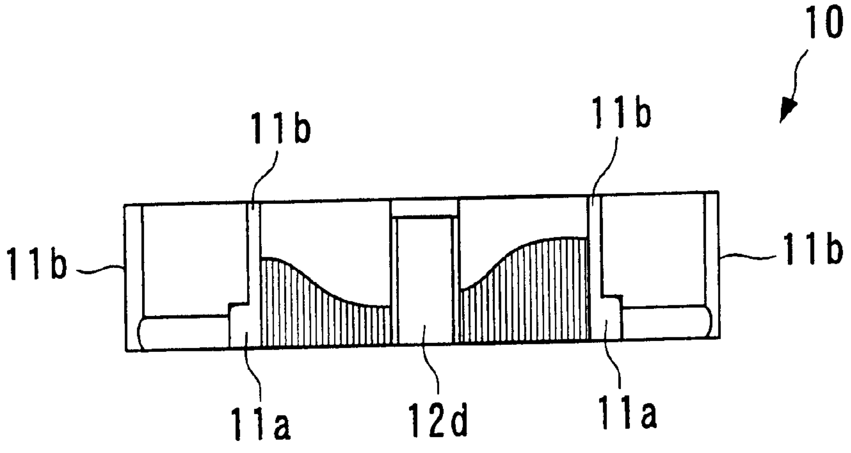
FIG. 4B is a sectional view taken on line A—A of FIG. 4A.
Figure 5:
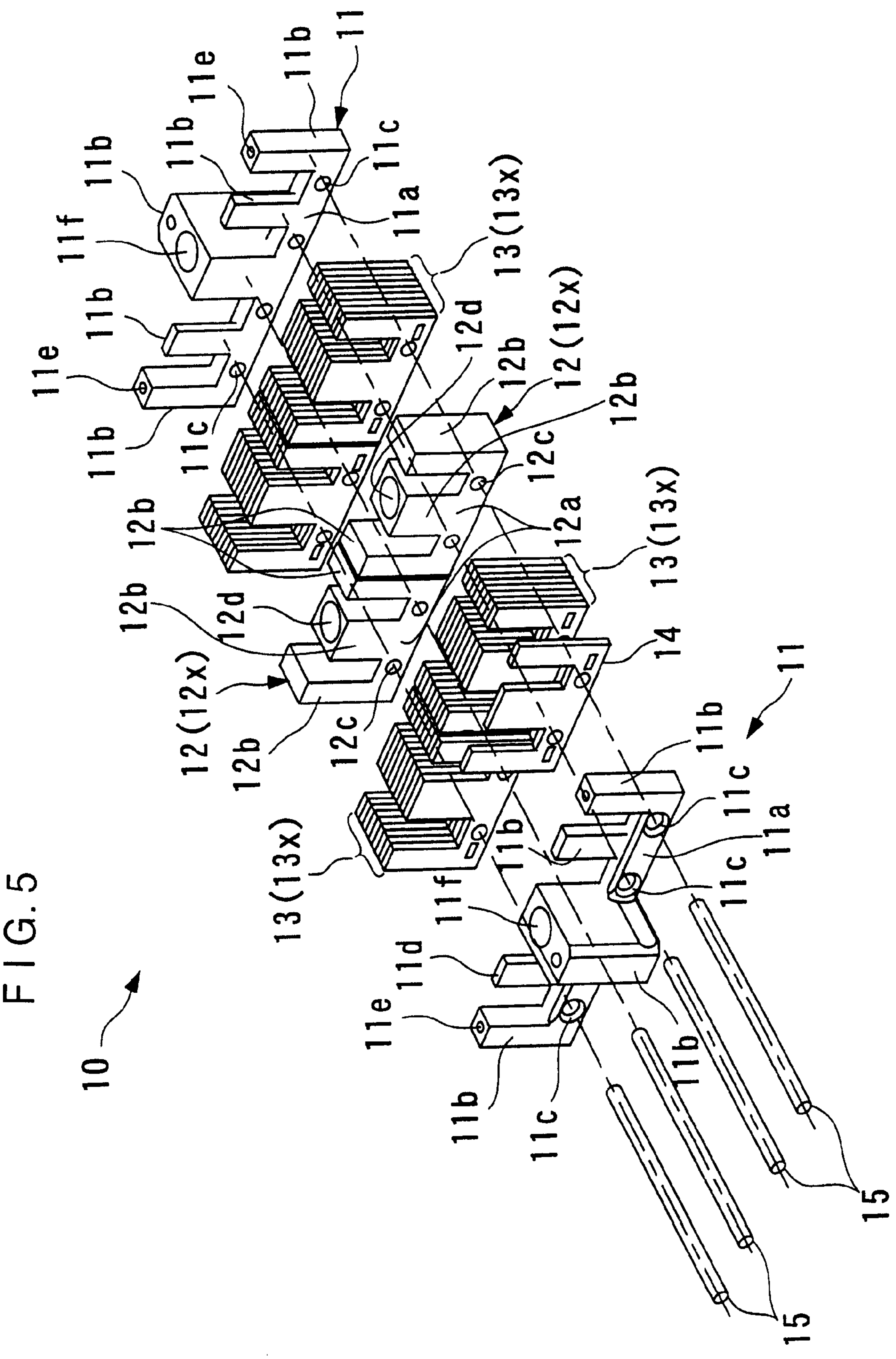
FIG. 5 is an exploded perspective view of the core shown in FIGS. 4A and 4B.

The lower electromagnet 1*b* includes a core 10 and two coils 16, 16 accommodated in respective coil grooves 10*a*, 10*a* formed in the core 10 (see FIG. 3). As shown in FIGS. 4A, 4B and 5, the core 10 is a unitary assembly formed by combining three core holders, i.e. left and right core holders 11, 11 and a central core holder 12, and left and right laminated stacks 13, 13 of core plates 14 by four rods 15.

The left and right core holders 11, 11 are each formed of the austenitic stainless steel similarly to the shafts 7. The two core holders 11, 11 are identical in construction and arranged in a manner symmetrically opposed to each other in the left-right direction. The following description is made by taking the left core holder 11 as an example. The left core holder 11 is a unitary comb-shaped member comprised of a base portion 11*a* extending in the front-rear direction and five retainer portions 11*b* each formed to have a shape of a hair comb tooth and extending upward from the base portion 11*a* to a predetermined height in a manner spaced from each other in the front-rear direction.

Each of the five retainer portions 11*b* is rectangular in cross section and has a right side face thereof flush with the right side face of the base portion 11*a*. On the other hand, the left side face of the middle retainer portion 11*b* protrudes outward or leftward with respect to the left side face of the base portion 11*a*, the left side faces of the respective front and rear retainer portions 11*b*, 11*b* are flush with that of the base portion 11*a*, and those of the inner retainer portions 11*b*, 11*b* formed between the middle retainer portion 11*b* and the respective front and rear retainer portions 11*b*, 11*b* are slightly recessed inward or rightward from the base portion 11*a*. It should be noted that the middle retainer portion 11*b* is formed by integrating a portion protruding outward or leftward from the base portion 11*a*.

Formed in respective predetermined portions of the base portion 11*a* are four through holes 11*c* each extending in the left-right direction and having a left-side opening chamfered. Further, the front and rear retainer portions 11*b* each have an upper face thereof formed with a round hole 11*e* open upward, and the middle retainer portion 11*b* is formed with a through hole 11*f* extending vertically.

The central core holder 12 is also formed of the same austenitic stainless steel as that of the core holder 11. The central core holder 12 extends in the front-rear direction and has the same length along this direction as that of the core holder 11. Further, the central core holder 12 has a comb-like shape in side view, which is substantially the same as the shape of the core holder 11. The central core holder 11 is formed by joining two holder members 12X, 12X to each other in the front-rear direction and has opposite flat side faces. Each of the holder members 12X has an E shape in cross section and has a base portion 12*a* extending in the front-rear direction, and three retainer portions 12*b*, 12*b*, 12*b* integrally formed with the base portion 12*e* and extending upward, respectively, from the front and rear ends and a central portion of the base portion 12*a*. The base portion 12*a* is formed therethrough with two through holes 12*c*, 12*c* extending in the left-right direction. The front and rear retainer portions 12*b*, 12*b* are identical in height to the retainer portions 11*b* of the core holder 11, and the middle retainer portion 12*b* is lower than the other retainer portions 12*b*, 12*b*. This enables the upper face of the central retainer portion 12*b* to serve as an indentation for receiving the flange 7*a* of the shaft 7 when the armature 8 is brought into abutment with the core 10 (see FIG. 1).

Further, the middle retainer portion 12*b* is formed therethrough with a through hole 12*d* extending vertically, in which is fitted the hollow cylindrical guide 12*e* (see FIG. 1) for guiding vertical sliding motion of the shaft 7.

The central core holder 12 is formed by joining the front retainer portion 12*b* of one of the holder members 12X, 12X constructed as above to the rear retainer portion 12*b* of the other. The two retainer portions 12*b*, 12*b* joined to each other to form the central portion of the central core holder 12 are opposed to the middle retainer portion 11*b* of the core holder 11. Similarly, the opposite front and rear retainer portions 12*b*, 12*b* of the central core holder 12 other than the two retainer portions 12*b*, 12*b* forming the central portion are opposed to the front and rear retainer portions 11*b*, 11*b* of the core holder 11, respectively, while the middle retainer portions 12*b*, 12*b* are opposed to the inner retainer portions 11*b*, 11*b*, respectively. Further, the four through holes 12*c* are identical in diameter to the four through holes 11*c* formed through the core holder 11, respectively, and each opposed to the corresponding one of the four through holes 11*c*.

Figure 6A:
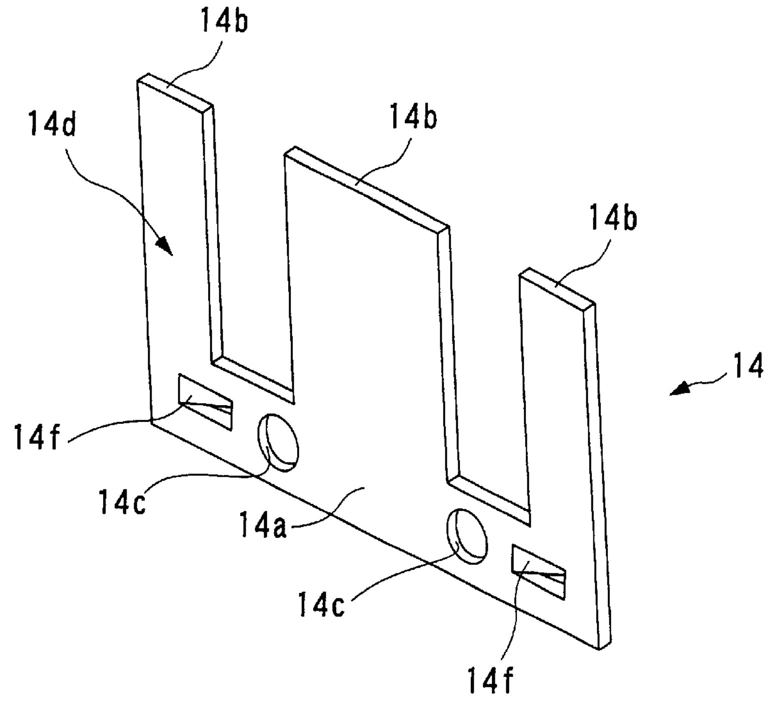
FIG. 6A is a perspective view of a core plate as a component of the core shown in FIGS. 4A and 4B.
Figure 6B:
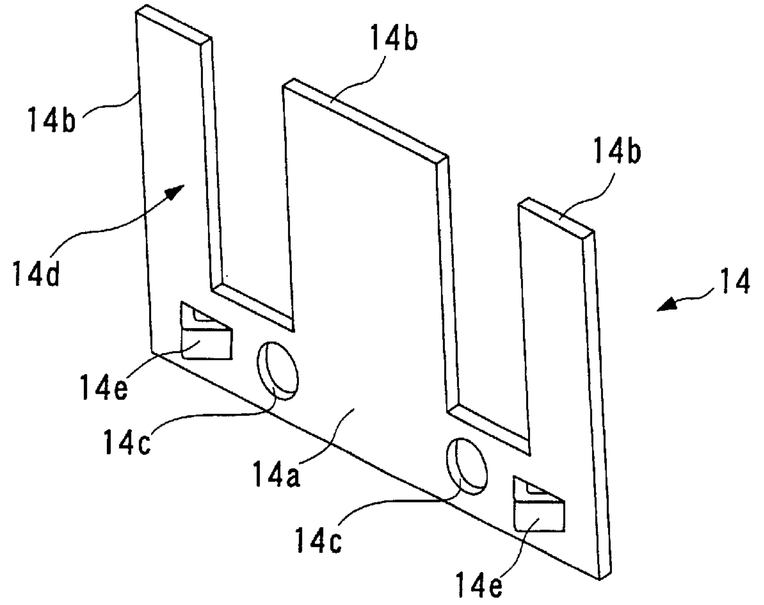
FIG. 6B is a perspective view showing the opposite side of the FIG. 6A core plate.
Figure 6C:
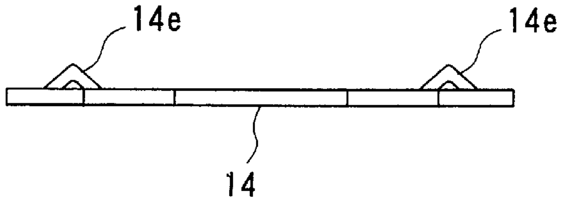
FIG. 6C is a plan view of the core plate.

The laminated stacks 13 are each comprised of a pair of laminated stacks 13X, 13X of core plates 14 arranged in the front-rear direction. Each laminated stack 13X of core plates 14 is formed by laminates of a predetermined number of core plates 14, one of which is shown in FIGS. 6A to 6C, in the left-right direction. Each core plate 14 is formed of a thin non-oriented silicon steel plate and has the whole surface thereof coated with an insulating film 14*d* e.g. of epoxy resin. Adjacent ones of the core plates 14 are insulated from each other by the insulating films 14*d*. Further, the core plate 14 is formed to have substantially the same E shape and size as those of the side face of the holder member 12X, by stamping a non-oriented silicon steel plate. More specifically, the core plate 14 is comprised of a base portion 14*a* extending in the front-rear direction and three magnetic path-forming portions 14*b*, 14*b*, 14*b* extending upward, respectively, from the front and rear ends and central portion of the base portion 14*a*, the base portion 14*a* being formed with two through holes 14*c*, 14*c* open in the left-right direction.

The three magnetic path-forming portions 14*b* are identical in height to each other, and lower than the front and rear retainer portions 12*b* of the central core holder 12 by a predetermined height (e.g. equal to or smaller than 20 $\mu$m), so that an upper face 13*a* of the laminated stack 13X is lower than the upper face 11*d* of the core holder 11 and an upper face 12*f* of the central core holder 12. The corresponding through holes 14*c* of the respective core plates 14 are continuous with each other to form a through hole extending through the laminated stack 13X in the left-right direction. Further, the through holes 14*c* are each identical in diameter to the corresponding through hole 11*c* of the core holder 11 and the corresponding through hole 12*c* of the core holder 12 and positioned in a manner concentric with the corresponding through holes 11*c* and 12*c*. Further, the base portion 14*a* is formed with two projections 14*e*, 14*e* at opposite locations slightly laterally outward of the respective through holes 14*c*, 14*c*. Each projection 14*e* having a V shape in plan view is projected rightward from the base portion 14*a*, and a recess 14*f* is formed in a reverse side of each projection 14*e*.

The projections 14*e* of one core plate 14 are each fitted in the corresponding recess 14*f* of another core plate 14 adjacent thereto in the rightward direction, whereby the core plates 14 are all held in a closely stacked state. Further, the core plate 14 positioned at the right end of the laminated stack 13X is formed not with the projections 14*e* and recesses 14*f*, but only with horizontally elongated rectangular holes, not shown, in which are fitted the respective corresponding projections 14*e* of the left-hand adjacent core plate 14. Therefore, the right end face of the laminated stack 13X is flat, so that it is in intimate contact with the central core holder 12 or the right core holder 11.

Each of the rods 15 is a round bar which is slightly smaller in diameter than the through holes 11*c*, 12*c*, 14*c*. The rods 15 are each fitted through the corresponding through holes 11*c*, 12*c*, 14*c* and extend in the left-right direction. The right and left end portions of each rod 15 projecting from the through holes 11*c*, 11*c*, respectively, are swaged on the outer end faces of the respective base portions 11*a* of the right and left core holders 11. Thus, the left-hand laminated stack 13 is sandwiched between the left core holder 11 and the central core holder 12, while the right-hand laminated stack 13 is sandwiched between the central core holder 12 and the right core holder 11, whereby these members are rigidly secured to each other to form the core 10.

The coils 16, 16 are each formed to have a horizontally elongated annular or toroidal shape and assembled with bobbins 17, 17 into a unitary assembly. Each bobbin 17 is formed of a synthetic resin and has a wall U-shaped in cross section for receiving a corresponding one of the coils 16, 16 therein. The bobbins 17, 17 are accommodated in the two coil grooves 10*a*, 10*a*, respectively. Each coil groove 10*a* is defined by the retainer portions 11*b* of the core holders 11, the retainer portions 12*b* of the central core holder 12, and the magnetic path-forming portions 14*b* of the core plates 14. Each of the coils 16, 16 is accommodated within the annular coil groove 10*a* in a manner enclosing the members positioned inside the annular coil groove 10*a*, i.e. the inner retainer portions 11*b* of the opposite core holders 11, the middle retainer portion 12*b* of the central core holder 12, and the middle magnetic path-forming portions 14*b*.

Figure 8A:
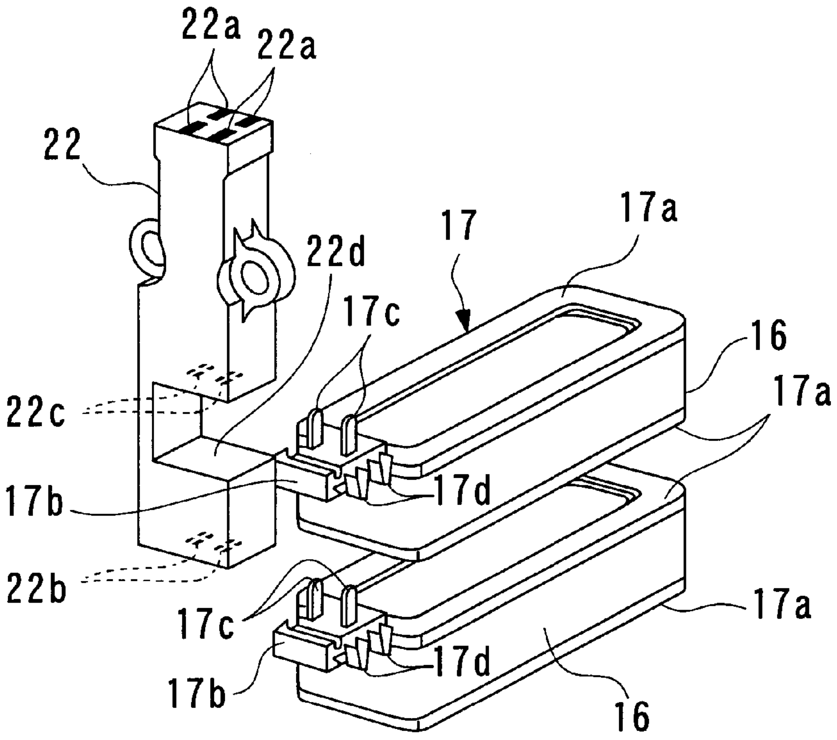
FIG. 8A is a perspective view of bobbins each bearing its associated components and a connector of the FIG. 2 solenoid actuator before they are assembled.
Figure 8B:
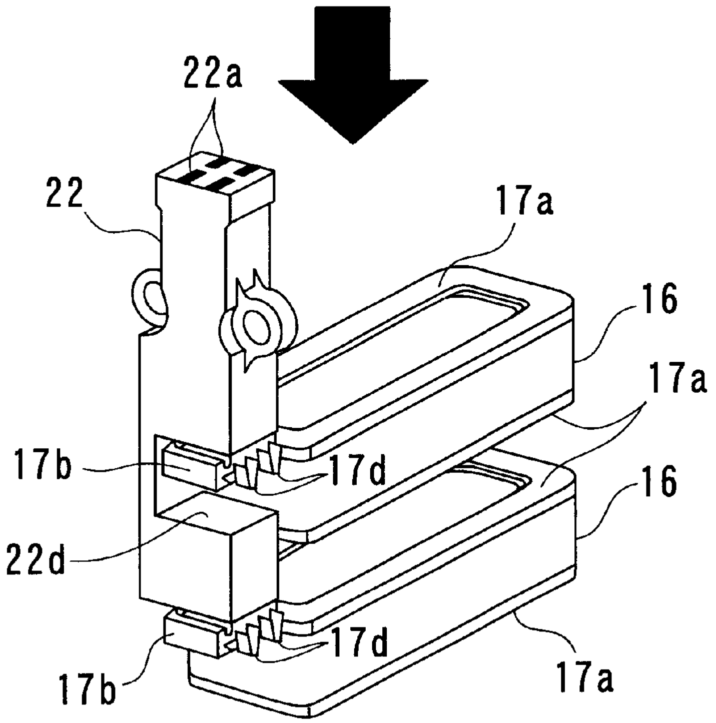
FIG. 8B is a perspective view of the bobbins each bearing its associated components and the connector of the FIG. 2 solenoid actuator after they are assembled.

As shown in FIGS. 8A and 8B, the bobbin 17 is comprised of upper and lower brims 17*a*, 17*a*, a terminal portion 17*b* projecting leftward from the left end of the upper brim 17*a*, a pair of front and rear terminals 17*c*, 17*c* projecting upward from the terminal portion 17*b*, and a pair of V-shaped metal connectors 17*d*, 17*d* connected to the terminals 17*c*, 17*c*. The front and rear terminals 17*c*, 17*c* are each formed of an electrically conductive metal plate and arranged such that principal planes thereof are positioned in a manner parallel and opposed to each other in the front-rear direction. The coil 16 is wound around the bobbin 17 between the upper and lower brims 17*a*, 17*a*, and the ends of the coil 16 are connected to the metal connectors 17*d*, 17*d*, respectively, to be electrically connected to the respective two terminals 17*c*, 17*c*.

The lower electromagnet 1*b* is constructed as above, and the upper electromagnet 1*b* is identical in construction to the lower electromagnet 1*b*. Further, as shown in FIGS. 2, 3 and 7A, 7B, the upper and lower electromagnets 1*b*, 1*b* are joined to each other by a pair of left and right guide joints 18, 18. The two guide joints 18, 18 (guide means; guides) are arranged in a manner symmetrically opposed to each other in the left-right direction. Each of the guide joints 18 is formed of an austenitic stainless steel and extends in the front-rear direction such that it has the same length as that of the core holder 11. The guide joint 18 has substantially the same shape in plan view as that of the core holder 11. More specifically, the guide joint 18 is comprised of a base portion 18*a* extending in the front-rear direction and a protrusion 18*b* integrally formed with the base portion 18*a* and protruding outward from the central portion of the same.

The protrusion 18*b* is formed with a vertical through hole 18*c* which is identical in diameter to the through hole 11*f* of the middle retainer portion 11*b* of the core holder 11 and positioned in a manner concentric with the same.

The base portion 18*a* is identical in height to the protrusion 18*b* and has round holes 18*d*, 18*d* formed, respectively, in the opposite end portions of the upper face thereof as well as round holes 18*d*, 18*d* formed, respectively, in the opposite end portions of the lower face thereof. Each round hole 18*d* is identical in diameter and concentric with the corresponding round hole 11*e* of the core holder 11. Fitted in each of the round holes 18*d* is half of a pin 19 in the form of a round rod formed of an austenitic stainless steel, and the other half of the pin 19 is fitted in the round hole 11*e*. This fitting of the pins 19 in the round holes 18*d* and 11*f* causes the upper and lower cores 10, 10 to be coupled to each other in a state positioned in a horizontal plane with respect to the guide joints 18, 18.

Further, arranged on the upper face of the base portion 18*a* are front and rear coil-protecting buffer plates 20, 20 (see FIG. 3). The coil-protecting buffer plates 20, 20 are identical in shape to each other and arranged in a symmetrical manner in the front-rear direction, so that the following description will be made by taking the front coil-protecting buffer plate 20 as an example. The front coil-protecting buffer plate 20 is formed of a synthetic resin and smaller in width in the left-right direction than the base portion 18*a*. Further, the buffer plate 20 is formed with opposite end projections 20*a* and a central projection 20*b* projecting vertically (downward in this example) from the underside thereof. The base portion 18*a* has two groves 18*e* and a hole 18*g* formed at respective predetermined locations on the front-side portion of the upper face thereof, and the two opposite end projections 20*a* are fitted in the two grooves 18*e*, and the central projection 20*b* is fitted in the hole 18*g*, respectively, whereby the front coil-protecting buffer plate 20 is mounted on the base portion 18*a*. The rear coil-protecting buffer plate 20 is mounted on the base portion 18*a* in the same manner. Further, on the lower face of the base portion 18*a*, there are also mounted front and rear coil-protecting buffer plates 20, 20 in a similar manner.

Further, the four armature guides 21 (guide members) are fixed to a guide surface 18*g* which is the inner surface of the guide joint 18 at predetermined space intervals, for guiding vertical reciprocating motion of the armatures 8 (see FIGS. 7A, 7B). Each armature guide 21 is formed of the austenitic stainless steel and has a fitting portion 21*a* which is rectangular in cross section and a guide portion 21*b* (protrusion) integrally formed with the fitting portion and semicircular in cross section. The inner side surface of the guide joint 18 has four vertical grooves 18*f* formed at predetermined space intervals. The fitting portion 21*a* of each armature guide 21 is fitted in the corresponding vertical groove 18*f* whereby the armature guide 21 is fixed to the guide joint 18. In this state, each of the guide portions semicircular in cross section protrudes toward the armature 8 from the guide surface 18*g* and at the same time held in line contact with the left end face 8*b* or the right end face 8*b* of the armature 8. Thus, the armatures 8 are each slidably guided by the corresponding ones of the armature guides 21 when they perform vertical reciprocating motion.

In a state where the upper and lower electromagnets 1*b*, 1*b* are joined to each other via the guide joint 18 constructed as above, each of the four coils 16 (bobbins 17) is vertically sandwiched by the corresponding core 10 and guide joints 18, as shown in FIG. 2, in a state of the brim 17*a* of the bobbin 17 in abutment with the corresponding coil-protecting buffer plate 20. In this sandwiched state, the shock or impact of the force applied to the bobbin 17 is absorbed by the coil-protecting buffer plate 20, which prevents the bobbin 17 from being deformed or damaged. Further, the through hole 11*f* of each core 10 and the through hole 18*c* of each guide joint 18 extend vertically in a manner continuous with each other. A bolt, not shown, is screwed into the cylinder head 2 through these holes 11*f*, 18*c*, whereby the electromagnets 1*b*, 1*b* are rigidly fixed to the cylinder head 2.

Further, as shown in FIGS. 8A, 8B, the front (or rear) coil 16 and bobbin 17 of the upper electromagnet 1*b* and the front (or rear) coil 16 and bobbin 17 of the lower electromagnet 1*b* are arranged vertically in an identical position in plan view. The two terminals 17*c*, 17*c* of each of the two bobbins 17 are connected to a connector 22 which is generally in the form of a rectangular column. The connector 22 is formed of a synthetic resin and extends vertically.

The connector 22 has an upper end face thereof formed with four upper socket openings 22*a* each in the form of a slit and open upward, and a lower end face thereof formed with two lower socket openings 22*b*, 22*b* each identical in shape to the upper socket opening 22*a*. The two lower socket openings 22*b*, 22*b* are parallel and opposed to each other in the front-rear direction and open downward at respective locations corresponding to the terminals 17*c*, 17*c*. Further, formed in the lower end portion of the connector 22 is a cut-away portion 22*d* formed by cutting away a parallelepiped portion of the connector 22 from the front side of the same. The cut-away portion 22*d* has an upper wall thereof formed with two middle socket openings 22*c*, 22*c*. The middle socket openings 22*c*, 22*c* are open downward and identical in position in plan view to the respective lower socket openings 22*b*, 22*b*. Within each of the socket openings 22*a* to 22*c*, there is provided a metal connector, not shown, comprised of two electrically conductive metal strips arranged in a manner each extending vertically and combined such that root portions thereof are held in contact with each other and a space therebetween is increased toward the outer or forward ends thereof. The terminals 17*c* are each sandwiched by the metal strips of a corresponding one of the metal connectors 22*e* in the socket openings 22*b*, 22*c*.

The metal connectors of the front two of the four upper socket openings 22*a* are electrically connected to the respective metal connectors of the middle socket openings 22*c*, 22*c*, while the metal connectors of the rear two of the four upper socket openings 22*a* are electrically connected to the respective metal connectors of the lower socket openings 22*b*, 22*b*. Further, a cable, not shown, having four terminals extends from a controller (power source), not shown, and the four terminals of the cable are plugged into the four socket openings 22*a*, respectively, whereby the four coils 16 are electrically connected to the controller.

Next, the operation of the solenoid actuator 1 constructed as above is explained. In the solenoid actuator 1, the front half thereof and the rear half thereof operate similarly, so that description is made by taking the operation of the front half as an example.

When neither of the upper and lower electromagnets 1*b*, 1*b* is energized, the front armature 8 is held in its neutral position between the upper and lower electromagnets 1*b*, 1*b* by the upper and lower coil springs 5 and 6. This causes the intake valve 3 to be in a halfway opened/closed position, not shown.

When the lower electromagnet 1*b*, for instance, is energized in this state by electric power supplied from the controller, the armature 8 is attracted by the lower electromagnet 1*b*, whereby the armature 8 is moved downward against the urging force of the lower coil spring 6 to a position where it is brought into abutment with the core 10 of the lower electromagnet 1*b*. At this time, the upper and lower shafts 7, 7 slide downward in a manner guided by the guides 12*e*, 12*e* of upper and lower cores 10, 10 respectively, and the armature 8 also slides downward while being guided by the armature guides 21 of the guide joints 18. This downward sliding motion of the armature 8 causes the intake valve 3 to open the intake port 2*a*.

Subsequently, when the energization of the lower electromagnet 1*b* is stopped, the armature 8 is moved upward by the urging force of the lower coil spring 6. Further, when the upper electromagnet 1*b* is energized at a predetermined timing, the armature 8 is attracted by the upper electromagnet 1*b*, whereby the armature 8 is moved upward against the urging force of the upper coil spring 5 to a position where it is brought into abutment with the core 10 of the upper electromagnet 1*b* (see the left-hand solenoid actuator 1 for driving the exhaust valves 4 in FIG. 1). This upward movement of the armature 8 causes the intake valve 3 to close the intake port 2*a*. Then, after stoppage of the energization of the upper electromagnet 1*b*, the lower electromagnet 1*b* is energized at a predetermined timing to cause the intake valve 3 to open the intake port 2*a*, similarly to the above. By repeatedly carrying out the above operations, the armature 8 is caused to vertically reciprocate between the upper and lower electromagnets 1*b*, 1*b*, thereby opening and closing the intake valve 3.

During this reciprocating motion, the armature 8 is guided by the guide joints 18 in a state of the two parallel opposite end faces 8*b*, 8*b* each in line contact with the two armature guides 21, 21, respectively, whereby even if the rotational force about the axis extending in the direction of the reciprocating motion of the armature 8 acts on the armature 8, the armature guides 21 inhibit the rotation of the armature 8. This makes it possible to prevent the armature 8 from interfering with the casing 1*a* or other components therearound. Further, the sliding of the armature 8 is performed in a state in line contact with each of the four armature guides 21, so that the armature receives a small sliding resistance therefrom. These advantageous features of the present embodiment ensure the smooth opening and closing of the intake valve, and enhances the durability of the solenoid actuator 1. It should be noted that when at least one armature guide 21 is provided on each guide surface 18*g*, and a total of at least three armature guides 21 are provided on the two guide surfaces 18*g*, it is possible to stably guide the armature 8 by the armature guides 21.

Further, the two electromagnets 1*b*, 1*b* are fixed to each other by a bolt, not shown, with the guide joints 18 sandwiched therebetween, so that the guide joints 18 serve as a spacer defining the distance between the two electromagnets 1*b*, 1*b*. Therefore, simply by changing the guide joints 18 to ones of a different type having a different height (vertical width), the distance over which the armature reciprocates, that is, the valve lift amount of the intake valve 3, can be easily changed. This makes it possible to change the valve lift amount of the intake valve 3 more easily than in the case where the core of each electromagnetic valve 1*b* is changed.

Although in the above embodiment, the armature 8 is guided by the armature guides 21, the construction for guiding the sliding of the armature 8 is not limited to this, but any protruding portion may be employed so long as it can guide the sliding of the armature in a state in partial contact with the end face 8*b* of the armature 8. For instance, there may be employed ball bearings rotatably embedded in the guide surface 18*g* of each guide joint 18 and partially protruding therefrom toward the armature 8. Further, although in the above embodiment, the armature 8 in the form of a rectangular plate is used, the shape of the armature 8 is not limited to this, but any suitable shape having two opposite parallel end faces, such as a hexagonal plate, may be used.

Further, although in the above embodiment, description is made of an example in which the armature 8 is attracted alternately by the upper and lower electromagnets 1*b*, 1*b*, for reciprocating motion, this is not limitative, but the solenoid actuator may be configured such that it uses one electromagnet and one coil spring, for instance, to cause the armature 8 to reciprocate. Further, although the solenoid actuator 1 is applied to the valve-actuating mechanism of the vehicle engine, this is not limitative, but the solenoid actuator 1 can be applied to various driving units, including one for driving a valve for opening and closing an EGR pipe one for driving fuel injection valves, and others for driving various kinds of driven members of the engine.

It is further understood by those skilled in the art that the foregoing is a preferred embodiment of the invention, and that various changes and modifications may be made without departing from the spirit and scope thereof.

What is claimed is:

1. A solenoid actuator for driving a driven member by an electromagnetic force such that said driven member performs reciprocating motion, comprising:

at least one electromagnet;

an armature connected to said driven member, for performing reciprocating motion in accordance with energization and deenergization of said at least one electromagnet to thereby drive said driven member such that said driven member performs said reciprocating motion, said armature having two end faces extending in parallel with each other in a direction orthogonal to a direction of said reciprocating motion thereof; and guide means having two guide surfaces opposed to said two end faces of said armature, respectively, said two guide surfaces being formed with a total of at least three protrusions at respective locations, each of said two guide surfaces being formed with at least one of said at least three protrusions, said guide means slidably guiding said reciprocating motion of said armature in a state of said two end faces of said armature being in partial contact with said at least three protrusions of said two guide surfaces of said guide means.

2. A solenoid actuator according to claim 1, wherein said at least one electromagnet comprises two electromagnets arranged on opposite sides of said armature in said direction of said reciprocating motion thereof, and fixed to each other with said guide means sandwiched therebetween.

3. A solenoid actuator according to claim 1, wherein said guide means comprises two guides arranged such that said two guides are opposed to said two end faces of said armature, respectively, and wherein said two guide surfaces are respective surfaces of said two guides facing toward said two end faces of said armature.

4. A solenoid actuator according to claim 3, wherein each of said respective surfaces of said two guides is formed with at least one groove extending along said direction of said reciprocating motion of said armature, a protruding member being fixed to each of said at least one groove, said protruding member having a fitting portion and a guide portion semicircular in cross section and integrally formed with said fitting portion, and wherein each of said at least three protrusions being the guide portion semicircular in cross section and in line contact with a corresponding one of said two end faces of said armature.

5. A solenoid actuator according to claim 1, including a shaft connecting said armature to said driven member and having a flange formed at one end thereof, and said armature is formed with a through hole extending through a central portion thereof along said direction of said reciprocating motion thereof and has a portion surrounding said through hole, said end of said shaft being fitted in said through hole such that said flange abuts said portion surrounding said through hole to thereby support said armature.

* * * * *